United States Patent
Thunuguntla et al.

(10) Patent No.: US 10,257,175 B2
(45) Date of Patent: Apr. 9, 2019

(54) ENCRYPTION DEPLOYMENT DISCOVERY

(71) Applicant: Fornetix LLC, Leesburg, VA (US)

(72) Inventors: Aravind Babu Thunuguntla, Hyderabad (IN); Jonathan Brant Mentzell, Hagerstown, MD (US); James M. Smith, Gore, VA (US); Joseph Brand, Charles Town, WV (US)

(73) Assignee: FORNETIX LLC, Leesburg, VA (US)

( * ) Notice: Subject to any disclaimer, the term of this patent is extended or adjusted under 35 U.S.C. 154(b) by 22 days.

(21) Appl. No.: 15/269,310

(22) Filed: Sep. 19, 2016

(65) Prior Publication Data

US 2017/0093819 A1    Mar. 30, 2017

Related U.S. Application Data

(60) Provisional application No. 62/233,900, filed on Sep. 28, 2015.

(51) Int. Cl.
   *H04L 29/06* (2006.01)
   *H04L 9/08* (2006.01)

(52) U.S. Cl.
   CPC .............. *H04L 63/06* (2013.01); *H04L 9/088* (2013.01); *H04L 9/0866* (2013.01); *H04L 9/0872* (2013.01); *H04L 9/0894* (2013.01); *H04L 63/20* (2013.01); *H04L 2209/24* (2013.01)

(58) Field of Classification Search
   CPC ....... H04L 63/06; H04L 9/088; H04L 9/0872; H04L 9/0866; H04L 63/20; H04L 9/0894; H04L 2209/24
   See application file for complete search history.

(56) References Cited

U.S. PATENT DOCUMENTS

| | | | | |
|---|---|---|---|---|
| 7,457,824 | B1* | 11/2008 | Strom | H04L 41/046 |
| 8,111,635 | B2* | 2/2012 | Kim | H04L 45/00 370/258 |
| 8,230,004 | B2* | 7/2012 | Igarashi | H04L 12/2809 709/203 |
| 9,894,042 | B2* | 2/2018 | Dawoud | H04L 63/0471 |
| 9,958,955 | B2* | 5/2018 | Qiu | G06F 3/0227 |
| 2004/0010654 | A1* | 1/2004 | Yasuda | G06F 3/0607 711/1 |

(Continued)

OTHER PUBLICATIONS

International Search Report and Written Opinion dated Dec. 13, 2016, from related application No. PCT/US2016/052666.

(Continued)

*Primary Examiner* — Mahfuzur Rahman
(74) *Attorney, Agent, or Firm* — Foley & Lardner LLP

(57) ABSTRACT

Apparatuses and methods are described herein discovering and managing key information, including, but not limited to, obtaining the key information associated with at least one segment, storing the key information, and at least one of generating at least one encryption report based on the key information, exporting the key information, or orchestrating keys based on the key information. In some embodiments, obtaining the key information includes at least interrogating encryption assets associated with at least one segment for key information, and receiving the key information from the encryption assets associated with the at least one segment.

16 Claims, 6 Drawing Sheets

(56) References Cited

U.S. PATENT DOCUMENTS

| | | | |
|---|---|---|---|
| 2006/0178954 A1 | 8/2006 | Thukral et al. | |
| 2012/0189022 A1* | 7/2012 | Gu | H04L 12/287 370/462 |
| 2012/0207284 A1 | 8/2012 | Tian et al. | |
| 2014/0317409 A1* | 10/2014 | Bartok | H04L 63/06 713/171 |
| 2014/0380036 A1* | 12/2014 | Neumann | H04L 63/062 713/150 |
| 2015/0086020 A1* | 3/2015 | Harjula | H04L 9/30 380/279 |
| 2015/0095642 A1* | 4/2015 | Spalka | G06F 21/6218 713/161 |
| 2015/0096011 A1 | 4/2015 | Watt | |
| 2015/0172256 A1 | 6/2015 | Chunduri et al. | |
| 2017/0244563 A1* | 8/2017 | Bartok | H04L 9/14 |

OTHER PUBLICATIONS

International Preliminary Report on Patentability dated Apr. 12, 2018, from application No. PCT/US2016/052666.

\* cited by examiner

ENCRYPTION DEPLOYMENT DISCOVERY

CROSS-REFERENCED TO RELATED PATENT APPLICATIONS

This application claims priority from Provisional Application No. 62/233,900, filed Sep. 28, 2015, which incorporated herein by reference in its entirety.

BACKGROUND

1. Field of the Invention

Embodiments of the present disclosure relate generally to key encryption, and more specifically, to discovering, extracting, analyzing, automatically registering key information of various encryption keys used in one or more network segments.

2. Background

In security systems, an encryption key refers to a parameter or data that dictates a mechanism through which plain data can be translated into encrypted data during an encryption process and a mechanism through which encrypted data can be translated into plain data during a decryption process. Generally, each network segment may include servers, services and user devices that use encryption keys. Each enterprise (e.g., a company, a university, an agency, a bank, a laboratory, or the like) may have at least one segment for its operations. The enterprise may not be aware of various aspects of the keys used by each server, services or user device associated with the enterprise. For example, the enterprise may not be aware of locations of all of their encryption assets or state (e.g., expiration date, length, strength, or the like) of the keys/certificates.

This is because the keys used in each segment may originate from different sources and have different key characteristics. For example, each key may be associated with a length, strength of cipher, and/or expiration date that can be different from other keys in the segment. In order for the enterprise to upkeep, replace, and access the keys, the enterprise would need to know key information for each key. Thus, without knowledge of the key information, the enterprise cannot effectively upkeep, replace, or access the keys.

Conventionally, a network administrator of the enterprise would have to log onto a server or device to obtain key information for inspection. For example, logging in may be necessary to create, remove, update, or delete any keys for the server or device. Therefore, key upkeep, replacement, and security strength assessment can be tremendously costly and labor-intensive for any enterprise to perform.

SUMMARY

Various embodiments relate to an encryption discovery tool for interrogating one or more network segments associated with devices (encryption assets) that use encryption keys. Particularly, the encryption discovery tool may use a Network Mapper (NMAP) to get key information from each segment of a broader network. Such key information may include, but not limited to, device identifier, device location, key type, expiration date, key origin, key length, key strength, and the like. The encryption discovery tool may gather and parse the key information for key management.

In some embodiments, a method for discovering key information includes interrogating at least one segment for key information associated with encryption assets of the at least one segment, receiving the key information the at least one segment, and storing the key information.

According to various embodiments, a non-transitory computer-readable medium containing processor-readable instructions is described. When the instructions are executed, a processor performs a method for discovering key information, including interrogating at least one segment for key information associated with encryption assets of the at least one segment, receiving the key information from the at least one segment, and storing the key information.

In some embodiments, a server for discovering key information includes a database and a processor configured with processor-readable instructions to interrogate at least one segment for key information associated with encryption assets of the at least one segment, receive the key information from the at least one segment, and store the key information.

In various embodiments, a method for discovery and managing key information, corresponding to keys used in encryption assets of at least one segment includes obtaining the key information associated with the at least one segment, storing the key information, and at least one of generating at least one encryption report based on the key information, exporting the key information, or orchestrating the keys based on the key information.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1:
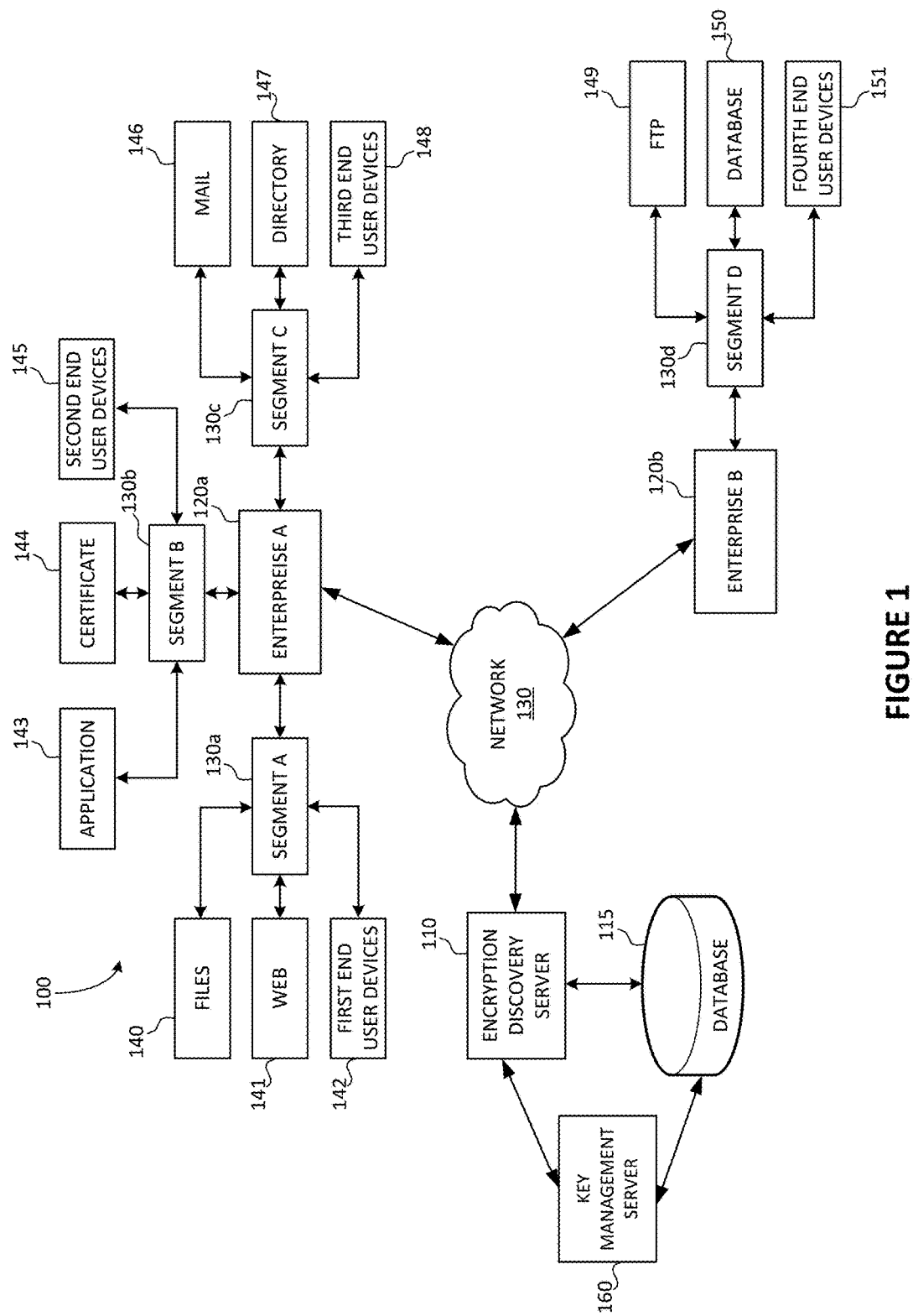
FIG. 1 is a schematic diagram of an example of an encryption employment system having an encryption discovery server for discovering encryption in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Embodiments of an encryption discovery tool may include an application executed on suitable computing platforms (e.g., a server) as coupled to a data storage device (e.g., a database). The encryption discovery tool may scan or otherwise interrogate one or more network segments for key information associated with encryption assets on the network segments. The key information may be gathered, stored, sorted, or exported for key management activities.

As referred to herein, "key information" ("attributes", "encryption attributes," "key attributes," or the like) associated with an encryption key may refer to characteristics associated with the key, cryptographic or security characteristics of the key, the cryptographic algorithms of the key, a device generating/transmitting/receiving the encryption key, a user of the device, and/or the like. The key may be transmitted and/or received with its associated key information represented in data values or signals. In particular embodiments, the key information may include, but not limited to, device identifier, device location, key type, key origin, key length, key strength, and the like.

"Key management" may refer to one or more of generating reports based on the key information, exporting data representing the key information, orchestrating the keys based on the key information, or the like. Particularly, the keys having its key information gathered may be orchestrated in a manner such as, but not limited to, described in one or more of U.S. Provisional Patent Application No. 61/887,662, filed on Oct. 7, 2013 entitled, "SYSTEM AND METHOD FOR ENCRYPTION KEY MANAGEMENT, FEDERATION AND DISTRIBUTION," U.S. Provisional Patent Application No. 61/950,362, filed on Mar. 10, 2014, entitled "SYSTEM AND METHOD FOR POLICY-ENABLED DISTRIBUTION OF ENCRYPTION KEYS," U.S. patent application Ser. No. 14/506,346, filed on Oct. 3, 2014, entitled "SYSTEM AND METHOD FOR ENCRYPTION KEY MANAGEMENT, FEDERATION AND DISTRIBUTION," which claims the benefit of U.S. Provisional Patent Application No. 61/887,662, filed Oct. 7, 2013, and U.S. Provisional Patent Application No. 61/950,362, filed Mar. 10, 2014, P.C.T. Application No. PCT/US2014/059187, filed on Oct. 3, 2014, entitled "SYSTEM AND METHOD FOR ENCRYPTION KEY MANAGEMENT, FEDERATION, AND DISTRIBUTION, which claims the benefit of U.S. Provisional Patent Application No. 61/887,662, filed Oct. 7, 2013, and U.S. Provisional Patent Application No. 61/950, 362, filed Mar. 10, 2014, U.S. Provisional Patent Application No. 62/132,342, filed on Mar. 12, 2015, entitled "SERVER CLIENT PKI FOR KEY ORCHESTRATION SYSTEM AND PROCESS," U.S. Patent Application No. 62/132,372, filed on Mar. 12, 2015, entitled "KO HIERARCHY FOR KEY ORCHESTRATION SYSTEM AND PROCESS," U.S. Patent Application No. 62/133,172, filed on Mar. 13, 2015, entitled "SERVER-CLIENT KEY ESCROW FOR KEY ORCHESTRATION SYSTEM AND PROCESS," OR U.S. Patent Application No. 62/132,379, filed on Mar. 13, 2015, entitled "CLIENT SERVICES FOR KEY ORCHESTRATION SYSTEM AND PROCESS," each of which is fully incorporated herein by reference in its entirety. Additionally, key management may also include automatic key/certificate registration with one or more servers for performing key management.

An "enterprise" may be a company, subgroup within a company, autonomous and independent entity, a communication group, security provider, various entities, organizations, and/or the like. Examples of an enterprise may include, but not limited to, a university, an agency, a bank, a laboratory, or the like. As referred to herein, a "segment" ("network segment") may be a network grouping or a portion of a greater network. In some embodiments, the segment may be defined using suitable identifiers such as, but not limited to, Internet Protocol (IP) addresses. Illustrating with a non-limiting example, a segment may correspond to a class A network, class B network, class C network, class D network, class E network, or the like. Each enterprise may use at least one segment for its operations.

As referred to herein, "encryption assets" may refer to devices (e.g., devices, servers, or databases) that implement encryption technology. Examples of encryption assets may include, but not limited to, a files server, web server, application server, certificate server, mail server, directory server, File Transfer Protocol (FTP) server, database, management server, E-Commerce server, or end user devices (computer work stations, mobile devices, servers, or the like).

FIG. 1 is a schematic diagram of an example of an encryption employment system 100 having an encryption discovery server 110 for discovering encryption in accordance with various embodiments. Referring to FIG. 1, the encryption discovery server 110 may be connected to networks of one or more enterprises through a network 130. Illustrating with a non-limiting example, the encryption discovery server 110 may be connected to networks of a first enterprise (enterprise A 120a) and a second enterprise (enterprise B 120b). The encryption discovery server 110 may be connected to one or three or more enterprises. The networks of the enterprises 120a, 120b may be supported by one or more servers (not shown).

Each of the networks of the one or more enterprises (e.g., the enterprise A 120a and enterprise B 120b) may be associated with at least one segment supported by the one or more servers. A segment may be a portion of a computer network, such as, but not limited to a group of encryption assets that share a network resource or that are otherwise designated to be included in the segment. Illustrating with a non-limiting example, the enterprise A 120a may be associated with a first segment (segment A 130a), a second segment (segment B 130b), and third segment (segment C 130c). The enterprise B 120b may be associated with a fourth segment (segment D 130d). Each of the segments 130a-130d may be established by their respective enterprises (the enterprise A 120a and enterprise B 120b) based on suitable criteria such as, but not limited to, location, work group, role within the enterprise, or the like. Illustrating with a non-limiting example, the segment A 130a may correspond to a network for a first office location of enterprise A 120a. The segment B 130b may correspond to a network for a second office location of enterprise B 120b. The segment C 130c may correspond to a network for a third office location of enterprise C 120c.

Each segment may include at least one encryption asset. Illustrating with a non-limiting example, the segment A 130a may be associated with at least a files server 140, a web server 141, and one or more first end user devices 142. The segment B 130b may be associated with at least an application server 143, a certificate server 144, and one or more second end user devices 145. The segment C 130c may be associated with at least a mail server 146, a directory server 147, and one or more third end user devices 148. The segment D 130d may be associated with at least a FTP server 149, a database 150, and one or more fourth end user devices 151. One or more of the encryption assets 140-151 may use some form of encryption key or certificate.

In some embodiments, the network 130 may allow communication between the encryption discovery server 110, the networks of the enterprises 120a, 120b, the segments 130a-130d, and/or the encryption assets 140-151. The network 130 may be a wide area communication network, such as, but not limited to, the Internet, or one or more Intranets, local area networks (LANs), Ethernet networks, metropolitan area networks (MANs), a wide area network (WAN), combinations thereof, or the like. The network 130 may also be a mobile data network such as, but not limited to, a 3G network, Long Term Evolution (LTE) network, 4G network, or the like. In particular embodiments, the network 130 may represent one or more secure networks configured with suitable security features, such as, but not limited to firewalls, encryption, or other software or hardware configurations that inhibits access to network communications by unauthorized personnel or entities.

In some embodiments, the encryption discovery server 110 may include a database 115. In some embodiments, the encryption discovery server 110 may be coupled to the database 115. In some embodiments, the database 115 may be connected to the encryption discovery server 110 through the network 130. In some embodiments, the database 115 may be connected to the encryption discovery server 110 through another suitable network. The database 115 may be configured to store or parse the extracted key information received from the segments 130*a*-130*d*. The database 115 may utilize a processor (e.g., a processor 210) of the encryption discovery server 110. Alternatively, the database 115 may include its own processor (such as, but not limited to the processor 210) to perform storing, parsing, report generating, or other processes described with respect to the database 115 and/or the encryption discovery server 110. Illustrating with a non-limiting example, the database 115 may be a SQLite database.

In particular embodiments, the database 115 may be capable of storing a greater amount of information and providing a greater level of security against unauthorized access to stored information, than a memory (e.g., a memory 220 of FIG. 2) of the encryption discovery server 110. The database 115 may include any suitable electronic storage device or system, including, but not limited to, Random Access Memory (RAM), Read Only Memory (ROM), floppy disks, hard disks, dongles, or other Recomp Sensory Board (RSB) connected memory devices, or the like. The database 115 may also be implemented with cloud storage.

A key management server 160 may be coupled to the encryption discovery server 110 and/or the database 115 to perform the key management or key orchestration activities as described herein.

Figure 2:
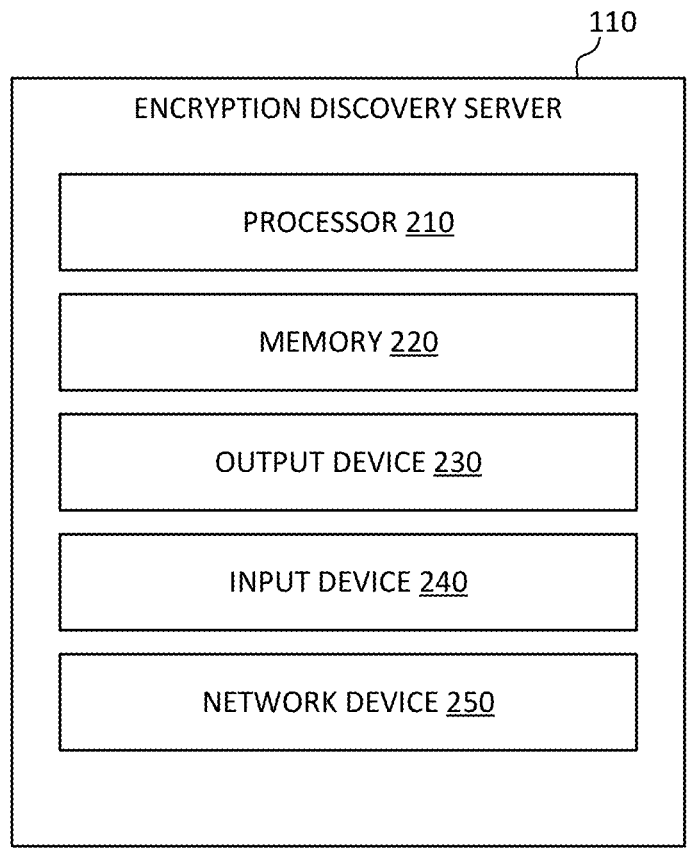
FIG. 2 is a component block diagram illustrating an example of an encryption discovery server according to various embodiments.

FIG. 2 is a component block diagram of an example of the encryption discovery server 110 (shown in FIG. 1) according to various embodiments. Referring to FIGS. 1-2, the encryption discovery server 110 may include at least one processor 210, memory 220 operatively coupled to the processor 210, at least one output device 230, at least one input device 240, and at least one network device 250.

In some embodiments, the encryption discovery server 110 may include a desktop computer, mainframe computer, server computer, laptop computer, pad device, smart phone device or the like, configured with hardware and software to perform operations described herein. For example, the encryption discovery server 110 may include a typical desktop Personal Computer (PC) or Apple™ computer devices, having suitable processing capabilities, memory, user interface (e.g., display and input) capabilities, and communication capabilities, when configured with suitable application software (or other software) to perform operations described herein. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the encryption discovery server 110 may include to dedicated device hardware specifically configured for performing operations described herein.

The processor 210 may include any suitable data processing device, such as a general-purpose processor (e.g., a microprocessor), but in the alternative, the processor 210 may be any conventional processor, controller, microcontroller, or state machine. The processor 210 may also be implemented as a combination of computing devices, e.g., a combination of a Digital Signal Processor (DSP) and a microprocessor, a plurality of microprocessors, at least one microprocessor in conjunction with a DSP core, or any other such configuration. The processor 210 may be configured with processor-readable instructions to perform features and functions of the encryption discovery server 110 as described herein.

The memory 220 may be operatively coupled to the processor 210 and may include any suitable device for storing software and data for controlling the processor 210 to perform operations and functions described herein. Particularly, the memory 220 may store processor-readable instructions for the encryption discovery tool application. The memory 220 may include, but not limited to, a RAM, ROM, floppy disks, hard disks, dongles, or other RSB connected memory devices, or the like. In some embodiments, the memory 220 may be a component separate from the database 115. In other embodiments, the memory 220 and the database 115 may be a same storage device.

In some embodiments, the encryption discovery server 110 may include at least one output device 230. The output device 230 may include any suitable device that provides a human-perceptible visible signal, audible signal, tactile signal, or any combination thereof, including, but not limited to a touchscreen, Liquid Crystal Display (LCD), Light Emitting Diode (LED), Cathode Ray Tube (CRT), plasma, or other suitable display screen, audio speaker or other audio generating device, combinations thereof, or the like.

In some embodiments, the encryption discovery server 110 may include at least one input device 240 that provides an interface for personnel (such as enterprise employees, technicians, or other authorized users) to access the encryption discovery server 110. The input device 240 may include any suitable device that receives input from a user including, but not limited to, one or more manual operator (such as, but not limited to a switch, button, touchscreen, knob, mouse, keyboard, keypad, slider or the like), microphone, or the like.

The network device 250 may be configured for connection with and communication over the network 130. The network device 250 may include interface software, hardware, or combinations thereof, for connection with and communication over the network 130. For example, the network device 250 may include at least one wireless receiver, transmitter, and/or transceiver electronics coupled with software to provide a wireless communication link with the network 130 (or with a network-connected device). In particular embodiments, the network device 250 may operate with the processor 210 for providing wired or wireless communication functions such as transmitting and receiving as described herein. The network device 250 may provide communications in accordance with typical industry standards, such as, but not limited the Internet, or one or more Intranets, LANs) Ethernet networks, MANs, WANs, 3G network, LTE network, 4G network, or the like.

Figure 3:
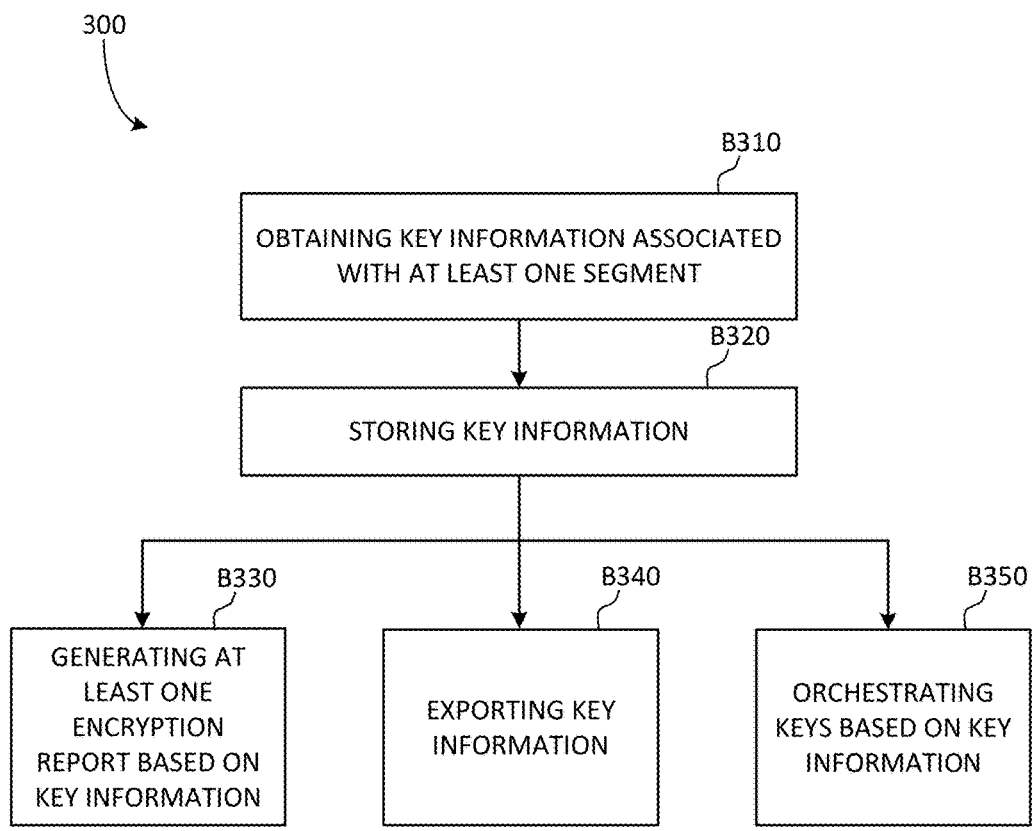
FIG. 3 is a process flowchart diagram illustrating an example of an encryption discovery method according to various embodiments.

FIG. 3 is a process flowchart diagram illustrating an example of an encryption discovery method 300 according to various embodiments. Referring to FIGS. 1-3, the processor 210 of the encryption discovery server 110 may obtain key information associated with at least one segment, at block B310. For example, the processor 210 of the encryption discovery server 110 may be configured to interrogate, scan, or otherwise request the at least one segment (e.g., one of more of the segments 130a-130d) to send the key information related to one or more of the encryption assets 140-151. The encryption discovery server 110 may receive the key information with the network device 250 in response.

At block B320, the processor 210 of the encryption discovery server 110 may be configured to store the key information in the database 115 and/or the memory 220 according to some embodiments. The key information may be organized or sorted based on suitable criteria such as, but not limited to, scans (interrogations), segments, encryption assets, enterprises, categories of key information (e.g., device identifier, device location, key type, key origin, key length, or key strength), or other suitable criteria.

With the stored information, the processor 210 of the encryption discovery server 110 (or another processor in a separate device such as the database 115) may be configured to perform one or more of (1) generating at least one encryption report based on the key information (block B330), (2) exporting the key information (block B340), and/or (3) orchestrating keys associated with the key information based on the key information (block B350).

With respect to the block B330, the processor 210 of the encryption discovery server 110 may be configured to output the at least one encryption report using the key information obtained at block B310 and stored at block B320. The encryption report may be organized in an illustrative and informative manner to show various aspects of the key information. For example, the encryption report may contain information related to a number of encryption assets scanned in obtaining the key information, geographic locations associated with the encryption assets, categories of keys, the certificate/key authority issuing the keys, encryption strength (strength of cipher), expiration dates of the keys, or other technical information related to the keys. The encryption report may be compiled, by the processor 210 of the encryption discovery server 110 (or another processor in a separate device such as the database 115), based on key information for one or more particular scans (interrogations), for one or more particular segments scanned, for one or more particular encryption assets, for one or more particular categories of key information, or other suitable criteria. A personnel (such as a security officer) can have a clear understanding of the status of encryption keys and certificates after digesting the strategic views provided by the reports and perform key management activities (e.g., by the key management server 160) accordingly.

The report may be generated as a web-based display, such as in a browser-window format. The report may also be generated in an electronic readable format, such as in a Microsoft Word document, Microsoft Excel document, a Portable Document Format (PDF), or the like.

With respect to block B340, the processor 210 of the encryption discovery server 110 may be configured to export the key information from the database 115 or another storage device in suitable formats such as, but not limited to, Microsoft Excel, Comma-Separated Values (CVS), Simile Model (SML), or the like. Illustrating with a non-limiting example, an exported SML file containing the key information may be used to create objects based on the key information. This would simply object creation by rendering superfluous rekeying or copying/pasting of the key information. With respect to block B350, key orchestration (as well as management, federation, and distribution) may be executed by the processor 210 of the encryption discovery server 110 or other suitable processors (e.g., of the key management server 160) for the keys based on the key information obtained.

Figure 4:
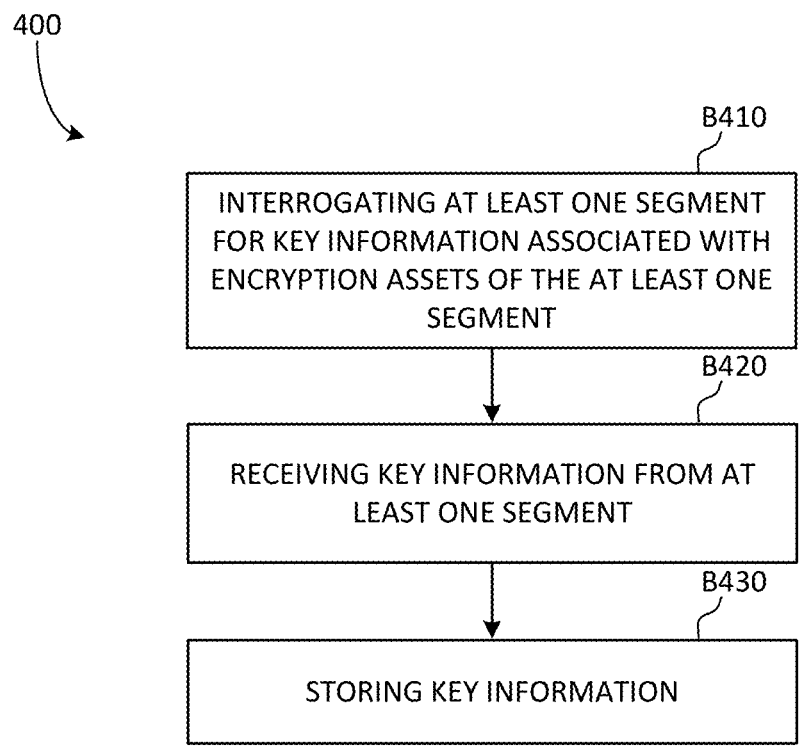
FIG. 4 is a process flowchart diagram illustrating an example of an encryption discovery method according to various embodiments.

FIG. 4 is a process flowchart diagram illustrating an example of an encryption discovery method 400 according to various embodiments. Referring to FIGS. 1-4, the encryption discovery method 400 may correspond to one or more blocks of the encryption discovery method 300. Particularly, blocks B410-B420 may correspond to block B310. Block B430 may correspond to block B320.

At block B410, the processor 210 of the encryption discovery server 110 may be configured to interrogate at least one segment for key information associated with encryption assets of the at least one segment. In some embodiments, user input selecting the at least one segment may be received by the encryption discovery server 110 via the input device 240. In some embodiments, the processor 210 of the encryption discovery server 110 may automatically select one or more segments based on suitable criteria such as, but not limited to, time since last interrogation was executed (for timed automatic scans). The processor 210 of the encryption discovery server 110 may be configured to solicit data including the key information from the encryption assets associated with the at least one selected segment. The at least one selected segment as well as the encryption assets may be identified with identifiers such as the IP address. The interrogation may be performed for segments with the corresponding identifier.

The processor 210 of the encryption discovery server 110 may be configured to interrogate the selected segment by sending a request embodied in signals to the selected segments. In some embodiments, the processor 210 of the encryption discovery server 110 may be configured to use the NMAP standard for sending such request. The NMAP standard may be a network tool for scanning and obtained detailed information related to devices on a network (e.g., the selected segment), port identity, or the like. Key information can be pulled by manipulating the NMAP to output data including the key information.

In response to two or more segments be selected to be interrogated, the processor 210 of the encryption discovery server 110 may be configured to perform interrogation as described herein for the two or more segments simultaneously. The processor 210 of the encryption discovery server 110 may be configured to aggregate processes for the two or more selected segments for interrogation by instructing the NMAP to interrogate the two or more selected segments simultaneously. In other embodiments, the segments may be interrogated sequentially. In either the simultaneous or sequential case, the number of segments interrogated per scan may be based on processing capabilities of the processor 210.

At block B420, the processor 210 as coupled to the network device 250 of the encryption discovery server 110 may receive the key information from the at least one segment in response to the interrogation. In some embodiments, the encryption discovery server 110 may receive the key information from the at least one segment interrogated. In some embodiments, the encryption discovery server 110 may receive the key information directly from the encryption assets corresponding to the at least one segment.

When the NMAP standard is implemented, the encryption discovery server 110 may receive output data in the NMAP format that may include the key information. The output data may be verbose. The processor 210 of the encryption discovery server 110 may be configured to extract the key information from the output data. Particularly, the processor 210 may be configured to extract the key information within a data layer of the NMAP output data. Illustrating with a non-limiting example, whether a key is a Secure Shell (SSH) key, Secure Sockets Layer (SSL) key, Rivest-Shamir-Adleman (RSA) cryptosystem, Digital Signature Algorithm (DSA), may be extracted to determine a key type/category for the key. Other key information such as, but not limited to, key length, key strength, expiration date, or the like may likewise extracted from the NMAP output data. The processor 210 may be configured to identify data identifiers associated with data types of interest (device identifier, device location, key type, expiration date, key origin, key length, key strength, and/or the like) when filtering the output data. Such data identifiers may include data file type, data content, particular portions of identifiable data, or the like. After identification, the processor may copy or move the data associated with the data identifiers to the database 115 or another suitable storage device. The processor 210 may interface with NMAP in order to filter/parse the output data. In other embodiments, suitable network enumeration and/or network mapping standards may be used to obtain the key information in a similar manner.

At block B430, the key information may be stored in a manner such as, but not limited to, described with respect to block B320.

Illustrating with a non-limiting example, a security officer of enterprise A 120a may be interested in learning the encryption status for the segment A 130a and the segment B 130b. The security officer may select, via the input device 240, the segment A 130a and the segment B 130b to be interrogated. The processor 210 of the encryption discovery server 110 may be configured to aggregate workflows for the segment A 130a and the segment B 130b. The processor 210 may request (using the NMAP standard) both the segment A 130a and the segment B 130b for the key information associated with corresponding encryption assets based on the aggregated workflow (e.g., at block B410). The NMAP output data may then be received (at block B420). The processor 210 may extract the key information from the NMAP output data. The key information may be stored (at block B430 or B320). Key management processes may then be performed at one or more of blocks B330-B350 (by the key management server 160).

Figure 5:
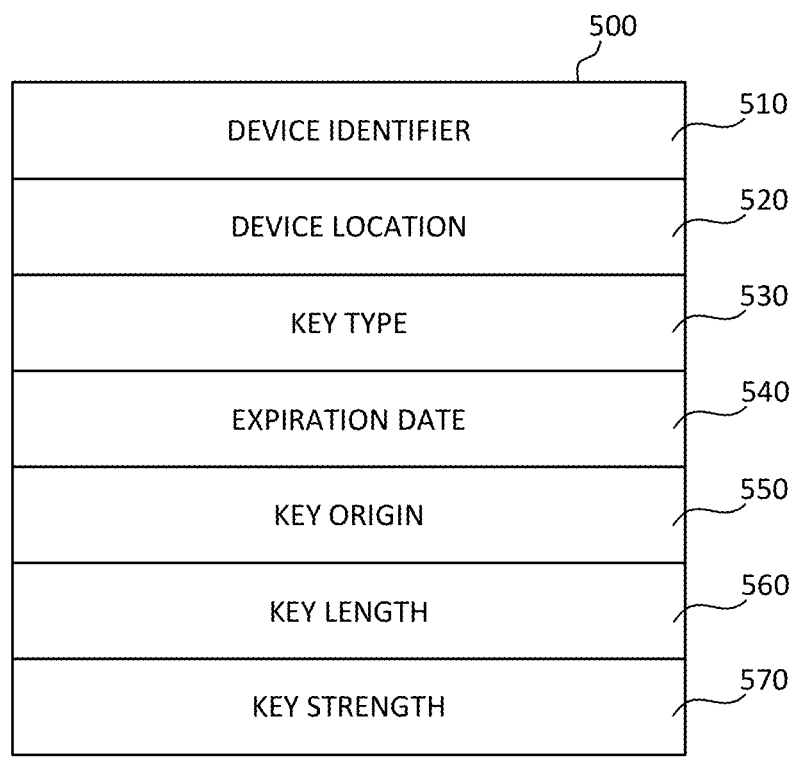
FIG. 5 is a diagram illustrating an example of key information according to various embodiments.

FIG. 5 is a diagram illustrating an example of key information 500 according to various embodiments. Referring to FIGS. 1-5, the key information 500 may be received from the segment or the encryption assets. The key information 500 may be extracted from the NMAP output data or other types of output data including the key information 500. The key information 500 may include one or more of, but not limited to, device identifier 510, device location 520, key type 530, expiration date 540, key origin 550, key length 560, or key strength 570.

In some embodiments, the device identifier 510 may refer to suitable description of an encryption asset. Examples of the device identifier 510 may include, but not limited to, device name, network address (e.g., IP address), device location, a combination thereof, and the like. In some embodiments, the device location 520 may be a geographic location where the encryption asset is physically located. In some embodiments, the device location 520 may be determined by the processor 210 based on the network address (the IP address) of the associated enterprise, segment, and/or encryption asset. For example, from the network address obtained, the processor 210 may query directory database (e.g., Lightweight Directory Access Protocol (LDAP) or Active Directory (AD)) of the enterprise/segment for obtaining device information including where the encryption asset associated with the network address is. In some embodiments, the device location 520 may be received directly as a part of the key information 500 without further determination. For example, Global Positioning System (GPS) data determined with GPS chips embedded in the encryption asset, enterprise server, or segment server may be transmitted to the encryption discovery server 110.

In some embodiments, the key type 530 may refer to a category or classification of the key. Examples of key type 530 may include, but not limited to, public, private, SSH, SSL, RSA, DSA, self-signed, Certificate Authority (CA)-signed, and the like. In some embodiments, the expiration date 540 may be point in time at which the key may become expired or invalid. The expiration data 540 may be generated when the key is generated by the CA.

In some embodiments, the key origin 550 may be a source that generated the key. Particularly, the key may be generated by the encryption asset (self-signed), a CA (e.g., Microsoft), a vendor, or the like. In some embodiments, the key length 560 may refer to a size of the key in bits. In some embodiments, the key strength 570 may refer to cryptographic security level (cryptic strength) of the key.

Figure 6:
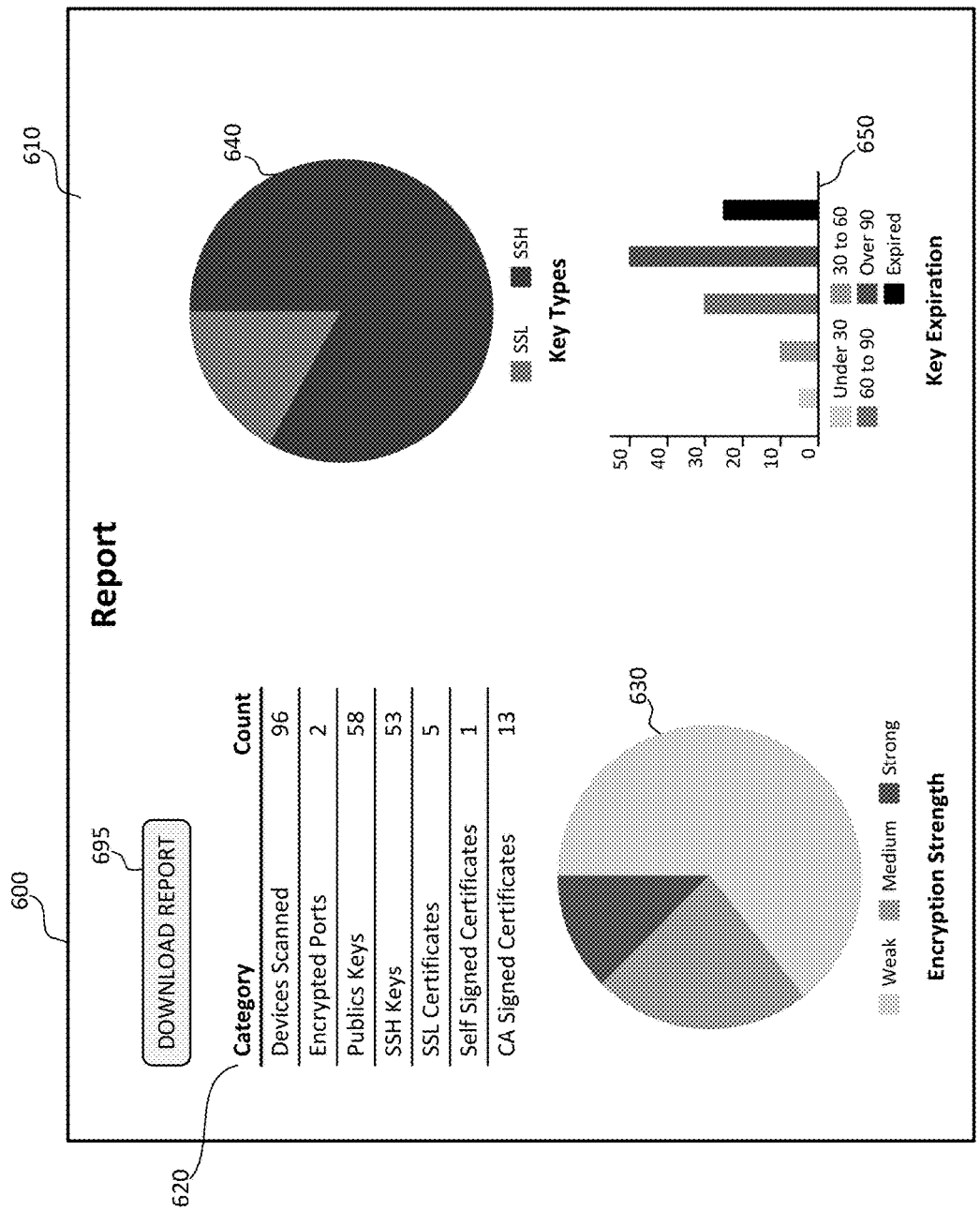
FIG. 6 is a display screen showing an example of an encryption report according to various embodiments.

FIG. 6 is a display screen 600 showing an example of an encryption report 610 according to various embodiments. Referring to FIGS. 1-6, the display screen 600 may be generated as a webpage. The encryption report 610 may be displayed according to block B330 according to some embodiments. The encryption report 610 may be generated for a particular interrogation (per interrogation) or scanning (per scan). Each act of interrogation may be for at least one segment within a same enterprise or two or more segments within two or more different enterprises. The encryption report 610 may contain at least a portion of the key information (e.g., the key information 500) according to some embodiments. Illustrating with a non-limiting example, the encryption report 610 may contain information related to one or more of the device identifier 510, device location 520, key type 530, expiration date 540, key origin 550, key length 560, or key strength 570.

The display screen 600 may include texts (e.g., a text portion 620) showing statistics based on the key information (e.g., the key information 500). In the non-limiting example of the display screen 600, a number of total encryption assets scanned, a number of encrypted ports located, a number of public keys, a number of SSH keys, a number of SSL certificates, a number of RSA, a number of DSA, a number of self-signed certificates, and a number of CA-signed certificates may be displayed.

The display screen 600 may also include at least one graph (e.g., a first graph 630, a second graph 640, a third graph 650, or the like) or other types of visual representations generated based on the key information (e.g., the key information 500). Illustrating with the non-limiting example, the first graph 630 may be a pie diagram representing encryption strength (e.g., the encryption strength 570) of the keys. The encryption strength may be divided in suitable levels such as, but not limited to, "weak," "medium," or "strong." The second graph 640 may be a pie diagram representing key types (e.g., the key type 530), which may be SSL, SSH, or additional/alternative key types (e.g., RSA, DSA, or the like). The third graph 650 may be a bar diagram representing expiration dates (e.g., the expiration date 540) of the keys.

The display screen 600 may further include at least one user interactive element (e.g., a download element 695) for downloading or otherwise exporting the encryption report 610 or the key information associated with the particular encryption report 610 according to block B340.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes Compact Disc (CD), laser disc, optical disc, Digital Versatile Disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for discovering key information, comprising:
   interrogating at least one segment for key information associated with encryption keys corresponding to each ones of encryption assets of the at least one segment;
   receiving output data including the key information associated with the encryption keys from the at least one segment in a network mapping format as a result of the interrogating;
   extracting the key information associated with the encryption keys from the output data;
   storing the key information; and
   performing a key management activity based on the stored key information;
   wherein the key information comprises at least one of: a device identifier, device location, key type, key origin, key length, or key strength; and
   wherein the network mapping format is a Network Mapper (NMAP) format, and the key information associated with the encryption keys is extracted within a data layer of the output data in the NMAP format.

2. The method of claim 1, further comprising receiving user input for selecting the at least one segment.

3. The method of claim 1, wherein the at least one segment is interrogated using Network Mapper (NMAP).

4. The method of claim 1, wherein the encryption assets comprise at least two of a files server, web server, application server, certificate server, mail server, directory server, File Transfer Protocol (FTP) server, database, management server, E-Commerce server, or end user devices.

5. The method of claim 1, wherein the key management activity comprises generating at least one encryption report based on the key information.

6. The method of claim 5, wherein the encryption report is generated in a webpage.

7. The method of claim 1, wherein the key management activity comprises exporting the key information.

8. The method of claim 1, wherein the key management activity comprises orchestrating keys based on the key information.

9. The method of claim 1, wherein each of the encryption assets are designated to be included in the at least one segment.

10. A non-transitory computer-readable medium containing processor-readable instructions such that, when executed, cause a processor to perform a method for discovering key information, the method comprising:
    interrogating at least one segment for key information associated with encryption keys corresponding to each ones of encryption assets of the at least one segment;
    receiving output data including the key information associated with the encryption keys from the at least one segment in a network mapping format as a result of the interrogating;
    extracting the key information associated with the encryption keys from the output data;
    storing the key information; and
    performing a key management activity based on the stored key information;
    wherein the key information comprises at least one of: a device identifier, device location, key type, key origin, key length, or key strength; and
    wherein the network mapping format is a Network Mapper (NMAP) format, and the key information associated with the encryption keys is extracted within a data layer of the output data in the NMAP format.

11. A server for discovering key information, the server comprising:
    a database;
    a processor; and
    memory coupled to the processor and storing computer-readable instructions that, when executed by the processor, cause the processor to:
        interrogate at least one segment for key information associated with encryption keys corresponding to each ones of encryption assets of the at least one segment;
        receive output data including the key information from the at least one segment in a network mapping format as a result of the interrogation;
        extract the key information associated with the encryption keys from the output data;
        store the key information; and
    perform a key management activity based on the stored key information;
    wherein the key information comprises at least one of: a device identifier, device location, key type, key origin, key length, or key strength; and
    wherein the network mapping format is a Network Mapper (NMAP) format, and the key information associated with the encryption keys is extracted within a data layer of the output data in the NMAP format.

12. The server of claim 11, wherein the processor is further configured with the processor-readable instructions to receive user input for selecting the at least one segment.

13. The server of claim 11, wherein the processor is configured with the processor-readable instructions to interrogate the at least one segment using Network Mapper (NMAP).

14. The server of claim 11, wherein the key information comprises at least one of: a device identifier, device location, key type, key origin, key length, or key strength.

15. The server of claim 11, wherein the encryption assets comprise at least two of a files server, web server, application server, certificate server, mail server, directory server, File Transfer Protocol (FTP) server, database, management server, E-Commerce server, or end user devices.

16. A method for discovery and managing key information corresponding to keys used in encryption assets of at least one segment, comprising:
    obtaining output data including the key information associated with the keys corresponding to each ones of the encryption assets of the at least one segment in a network mapping format, the output data including the key information being obtained using Network Mapper (NMAP);
    extracting the key information associated with the keys within a data layer of the output data in the network mapping format, the key information comprising at least one of: a device identifier, device location, key type, key origin, key length, or key strength;
    storing the key information; and
    performing a key management activity based on the stored key information, the key management activity including at least one of:
        generating at least one encryption report based on the key information;
        exporting the key information; or
        orchestrating the keys based on the key information;
    wherein obtaining the output data including the key information comprises interrogating the at least one segment for the key information associated with the keys; and receiving the output data including the key information associated with the keys from the at least one segment in the network mapping format as a result of the interrogating.

* * * * *